United States Patent

Heinz et al.

[11] Patent Number: 6,069,756
[45] Date of Patent: May 30, 2000

[54] MANUALLY-ADJUSTABLE MIRROR

[75] Inventors: Jürgen Heinz, Assamstadt; Thomas Hempel, Steinheim, both of Germany

[73] Assignee: Magna Reflex Holding GmbH, Assamstadt, Germany

[21] Appl. No.: 09/180,138
[22] PCT Filed: May 5, 1997
[86] PCT No.: PCT/DE97/00920
 § 371 Date: Mar. 2, 1999
 § 102(e) Date: Mar. 2, 1999
[87] PCT Pub. No.: WO97/42054
 PCT Pub. Date: Nov. 13, 1997

[30] Foreign Application Priority Data

May 7, 1996 [DE] Germany ............................ 196 20 157

[51] Int. Cl.[7] .................................................. G02B 7/182
[52] U.S. Cl. ......................... 359/871; 359/872; 359/873
[58] Field of Search ..................................... 359/871, 872, 359/873; 240/573

Primary Examiner—Cassandra Spyrou
Assistant Examiner—Mohammad Sikder
Attorney, Agent, or Firm—Howard & Howard

[57] ABSTRACT

A manually adjustable mirror (1) comprising a mirror foot (4) and a mirror housing (2). The mirror housing (2) is rotatably connected to the mirror foot (4) by a fastening member (11) such that the mirror housing (2) is rotatable about at least two axes. Two transducers (6a, 6b, 7a, 7b) are disposed within the mirror housing (2). Two corresponding operation elements (10, 10a, 10b, 17) are mounted within the mirror housing (2) and moveable relative to the mirror housing (2). The operation elements (10, 10a, 10b, 17) are selectively engageable with the transducers (6a, 6b, 7a, 7b) to move the transducers (6a, 6b, 7a, 7b) in response to movement of the mirror housing (2). The transducers (6a, 6b, 7a, 7b) can then detect the relative movement of the mirror housing (2) to the mirror foot (4).

10 Claims, 2 Drawing Sheets

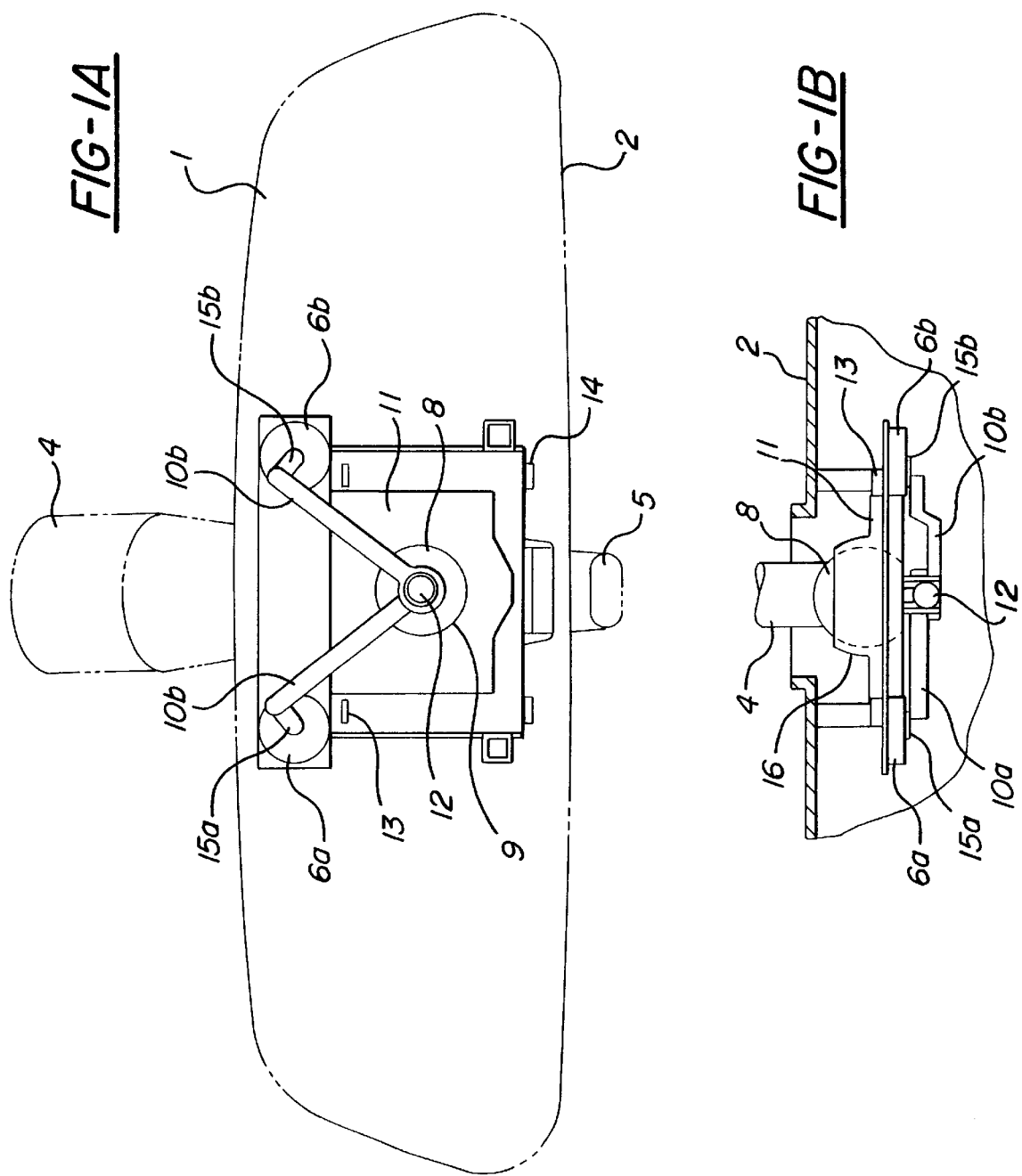

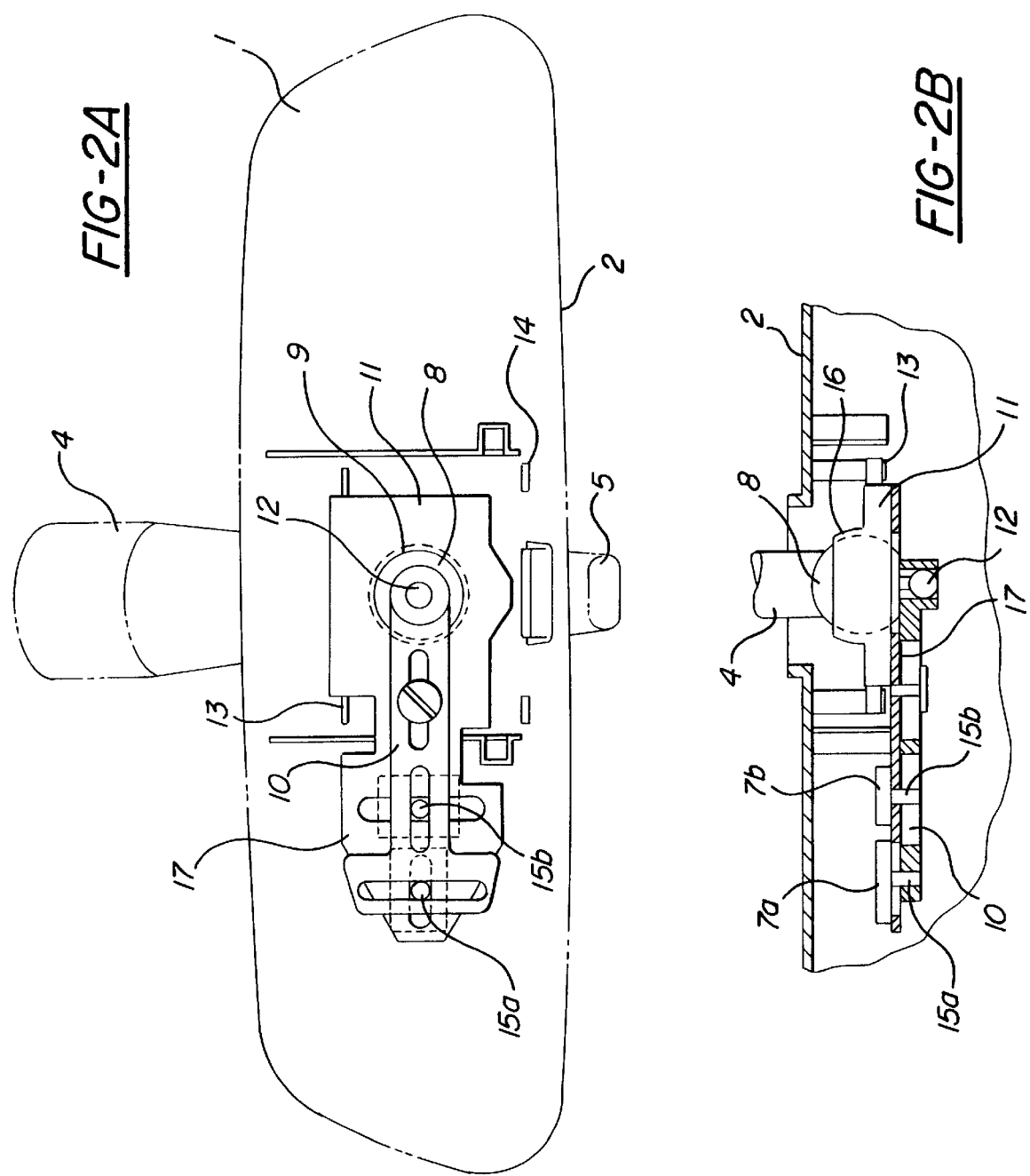

MANUALLY-ADJUSTABLE MIRROR

TECHNICAL FIELD

The invention relates to a manually adjustable mirror having a device for detecting the position thereof.

BACKGROUND OF THE INVENTION

Devices for the determination of the orientation of a motor vehicle mirror relative to the motor vehicle, in particular, an interior mirror are well known. Therein, sensors as angle transmitters are operatively connected to the interior mirror, for example, which are arranged outside the interior mirror. The values measured by the device for detection of the mirror position, for example, are used to adjust the position of another mirror, such as a side mirror, to the seat position and the driver's view depending on the orientation of the interior mirror.

Accordingly, the side mirrors can be automatically positioned for the driver by a proper adjustment of the interior mirror such that an optimum rearview field is constantly guaranteed.

Such systems provide to the motor vehicle system in the most terms information about the size, seat position, direction of view and driver's field of view. Hence, also other functions depending on the driver's position or the driver's direction of view and the driver's field of view, respectively, can be affected and controlled by the information derived via the interior mirror.

Mechanically dipping mirrors have not only to be rotatable relative to the mirror foot, in order to adapt the mirror position to the driver's position. Additionally, the mirror surface has to be rotatable about the transversal mirror axis at a defined angle, in order to dip the mirror. Therefore, the mirror housing and mirror glass are rotatable secured to a spherical member via a pivot, a toggle link and a tilting lever, with the spherical member in turn forms together with a ball fixed to the mirror foot a ball-and-socket joint being rotatable in all directions.

Switching over from day trip to night trip in order to avoid interfering reflexions caused by headlights of following motor vehicles is achieved by actuating the tilting lever, with the aid thereof the mirror housing and mirror glass can be rotated about the transversal vehicle axis at an predetermined angle.

SUMMARY OF THE INVENTION AND ADVANTAGES

When the position of the mirror glass relative to the vehicle is detected, so the tilting motion with the switching over from day trip to night trip is also detected, with the tilting motion being unimportant for the geometry of the optical path from the driver to the mirror and rearwardly, such that errors result with following-up the adjustment of the side mirrors.

It is the object of the present invention to provide a manually adjustable mirror having a respective device for detection the position thereof, which does not comprise any external parts to be mounted separately from the mirror and optically interfering parts as well, and is flat formed, and in which furthermore the tilting of the mirror element for switching over between day trip and night trip does not affect the measured position of the mirror. Furthermore, the device according to the invention is to be constructed safe, reliable and simply as well as to provide measurements with a good accuracy.

This object is solved with the device according to the invention in combination with the characterizing features thereof.

By locating the transducers and member for controlling inside the mirror housing, any external sensors are not provided, which are optically interfering or require an additional assembly. Furthermore, by receiving the sensors inside the mirror housing, a flat construction of the mirror remains maintained.

Advantageous improvements of the motor vehicle mirror according to the invention are described in the dependent claims.

By fixedly mounting the transducers to a fastening member, besides this the mirror housing is pivotable for dipping, and the controlling members are connected to the mirror foot, only motions of the fastening member relative to the mirror foot are detected. Of course, the coordination of the transducer and the device affecting the transducer toward the mirror foot and the fastening member can also be inversed.

With switching over from day trip to night trip by means of a tilting lever the mirror member is now rotated indeed relative to the mirror foot such as about the transversal vehicle axis, however, but the fastening member does not move. Accordingly, this tilting motion is not detected and the measured values remain unchanged, as the geometry of the visual ray from the driver via the mirror rearwardly remains unchanged as well with the switching over from day to night.

Advantageous improvements of the motor vehicle mirrors are described in the dependent claims.

By measuring only the rotations of the motor vehicle mirror about axes located inside the mirror plane, a rotation of the mirror about the normal toward the mirror surface will not be detected. Such rotations merely result in a change of the driver's field of view, which is unimportant for positioning the side mirrors, for example. Accordingly, the number of detected measured values is limited to the lowest required number, whereby the constructional expenditure and structural size of the device according to the invention are further reduced.

Advantageously, electric transducers can be used such as slide resistors and rotary potentiometers respectively. The slide resistors or rotary potentiometers can be actuated by connecting rods, which are articulated to the mirror foot via a pivot. By a suitable arrangement of the connecting rods can be achieved, that motions about the axes being perpendicular upon the normal to the mirror surface are merely transmitted to the transducers.

Particularly reliable, safe and cost-saving is the use of Hall elements as transducers on the fastening member, to which are associated magnetic elements affecting to the Hall elements on the mirror foot and connecting rods respectively. Of course, the Hall elements can also be arranged on the mirror foot and the connecting rods respectively and the magnetic elements can be arranged to the fastening member. Such constructions are in particular suitable for a contactless, with minimum wear transmission of the mirror motions to the transducers.

When the fastening member is connected to the mirror foot via a ball-and-socket-joint, swivelling rollers as momentum pulse generator are suitable as momentum transducers, which are frictionally mounted to the ball of the rotatable mirror attachment on the spherical member. With this embodiment, the ball of the rotatable mirror attachment as a device for controlling the transducers itself acts upon the swivelling rollers as a transducer. For detecting the mirror rotations about perpendicular axes located in the plane of the mirror surface, two rollers are sufficient which are preferably pivotally supported about two perpendicular axes located in the plane of the mirror surface, such that each of such rollers detects one of these rotations.

DESCRIPTION OF THE DRAWINGS

In the following, some exemplary embodiments of the motor vehicle mirror are described.

FIG. 1A is a front view of an adjustable interior mirror having a device according to the invention;

FIG. 1B is a fragmentary top view of the adjustable interior mirror and device of FIG. 1A;

FIG. 2A is a front view of an alternative embodiment of the adjustable interior mirror having a device according to the alternative embodiment of the invention; and FIG. 2B is a fragmentary top view of the adjustable interior mirror and device of FIG. 2A.

FIGS. 1A and 1B disclose an adjustable interior mirror 1 having a device for detecting the position of the mirror 1. The interior mirror has a housing 2, which carries a mirror element not shown covering with a flat mirror surface said housing 2 toward the driver on the total height and width of the mirror housing. The mirror housing is articulated to a support like fastening member 11 via a bearing 13 and a toggle link 14. On the toggle link 14 a tilting lever 5 is mounted, which protrudes through an opening from the housing 2. The support like fastening member 11 comprises a spherical member 16 for a ball 9, which is designed to be fixed to a mirror foot 4 and which forms a ball-and-socket joint 8 with it being free movable over predetermined angle ranges in all rotational directions. The interior mirror 1 is fixedly mounted to the vehicle via a mirror foot 4.

First rotary potentiometer 6a and second rotary potentiometer 6b respectively are mounted to the support like fastening member 11, left and right above the ball-and-socket joint 8. Two connecting rods 10a and 10b, preferably of flat profile, are connected to these rotary potentiometers via lever arms 15a and 15b radially extending outwardly from the axes of said rotary potentiometers. The connecting rods 10a and 10b at the other end thereof are articulated together to a fulcrum via a pivot 12 on the mirror foot 4, and diverge V-shaped starting from this to the rotary potentiometer 6a and rotary potentiometer 6b. The pivot 12 comprises a ball fixedly connected to the ball 9 and the mirror foot 4 respectively, with the ball is encompassed by the connecting rods 10a and 10b.

When the mirror housing 2 is rotated now about an axis perpendicular to the normal to the mirror surface, so the pivot 12 is sidely articulated, and the connecting rods 10a and 10b move relative to the rotary potentiometers 6a and 6b. Thereby, the adjustments and electric output signals of the rotary potentiometers 6a and 6b are changed via the connecting rods 15a and 15b in a manner, which directly suggest to the motion of the mirror housing 2. But the position of the mirror housing 2 and hence the mirror surface as well are definitely determined reversibly by the position of the potentiometers 6a and 6b.

However, by this particular form of the point 12 the rotations of the mirror 1 about the normal to the mirror surface do not affect to the position of the connecting rods 10a and 10b so that such rotations, as desired, will not be detected.

DETAILED DESCRIPTION OF THE PREFERRED EMBODIMENT

When the mirror 1 is switched over with the tilting lever 5 from day trip to night trip, so the mirror housing 2 rotates inside the ball-and-socket joint 13 and adopts its tilted position being caused by the tilting lever 5 and toggle link 14. Since herein the support like fastening member 11 is not moved, no signal will be generated as well, which would indicate a change of the mirror position.

FIGS. 2A and 2B disclose an interior mirror 1 for a motor vehicle according to another embodiment. Therein, the same drawing references functionally designate the same parts as in FIG. 1. The mirror housing 2 of the mirror 1 in turn is connected to a support like fastening member 11 comprising a spherical member 16 via a ball-and-socket joint 13 and a toggle link 14, and this fastening member is connected to the mirror foot 4 via a ball 9 received inside the spherical member 16. At the side of the ball 9 of the ball-and-socket joint 8 and inside the housing 2 two slides resistors 7a and 7b are mounted to a plate 17 connected to the support like fastening member 11. A flat connecting rod or connecting plate 10 is further connected to the mirror foot 4 via a pivot 12, with the connecting plate essentially extends in the plane of the mirror surface and engages into the sliding elements of the slide potentiometers 7a and 7b via the connecting pins 15a and 15b. The connecting rod 10 comprises an aperture extending longitudinally of the connecting rod at such a plate, where it engages into the sliding element or the slide resistor 7b via connecting pins 15a and 15b, and an aperture transversally to the connecting rod 10 at such a place, where it engages into the slide element of the slide resistor 7a. Slide potentiometer 7a is located such that its slide element moves transversally toward the longitudinal direction of the connecting rod 10, and the slide potentiometer 7b is located such that the slide element thereof moves along the connecting rod 10. The plate 17 and the connecting rod 10 are such flat, that the mirror housing 2 can be formed flat and the depth thereof does not increase or does not essentially increase to well known mirrors.

With the rotation of the mirror housing 2 about one of two orthogonal axes being perpendicular to the normal of the mirror surface, the fastening member 11 is moved relative to the connecting rod 10 in the direction of the other axis respectively. Accordingly, with these motions a relative motion results between the slide resistor 7a and slide resistor 7b secured to the plate 17 and the fastening member 11, respectively, and the connecting rod 10, which rotates relative to the mirror foot 4 inside the pivot 12. This relative motion leads to a change of the position of the slide resistors 7a and 7b, which is definitely determined reversibly by the position of the mirror 1 relating to these two axes.

When the mirror 1 is rotated for example about the axis being perpendicular upon the travel surface and being perpendicular to the normal of the mirror surface, thus the connecting rod 10 is moved in the longitudinal direction thereof relative to the plate 17. Thereby the slide resistor 7a is articulated while the sliding element of the slide resistor 7b slides unvariedly in its position inside of the longitudinally directed oblong aperture in the connecting rod 10. Inversely, the sliding element of the slide resistor 7a slides inside the transversal oblong aperture of the connecting rod 10, without changing its position, when the mirror is rotated about the axis being parallel to the travel surface perpendicular upon the normal toward the mirror surface.

A rotation of the mirror frame 2 about the normal toward the mirror surface does not lead to any displacement of the connecting rod 10 and the support like fastening member 11 relative to each other, so that such a rotation is not detected.

As already described with regards to FIGS. 1A and 1B, tilting of the mirror frame 2 by means of the tilting lever 5 does not lead to a motion of the fastening member 11 or the mirror foot 4 a swell, such that this motion is not detected as well.

The signals of the transducers 6a, 6b, 7a and 7b in FIGS. 1A and 1B and FIGS. 2A and 2B can be used for the side mirrors of the vehicle to automatically follow-up the changes of the position of the interior mirror such that with a changed sitting position of the driver this has merely to manually adjust the interior mirror.

Herein, it is particularly advantageous, that the interior mirror can be dipped for night trip, without the position of the side mirrors for example is changed via an automatic control in an undesired manner.

Furthermore, only the rotations of the interior mirror are detected being essentially for controlling the side mirror about the axes being perpendicular upon the normal to the mirror surface.

As another embodiment of the device according to the invention Hall elements can be used in place of slide resistors of the embodiment shown in FIGS. 2A and 2B upon which affect magnetic elements being located at the end of the connecting rod 10 and being spatially associated to the Hall elements. With corresponding wiring of the Hall elements, in turn any motions of the connecting rods 10 relative to the fastening member 11 in the plane of the mirror surface resolved into two orthogonal components can be detected.

The rotations of the ball 9, being essential for determining the position of the mirror, inside the spherical member 16 of the fastening member 11 of a mirror as in FIGS. 1A and 1B can also be detected by two rollers as rotation sensors frictionally contacting the ball 9. These rollers are stationary mounted inside the spherical member 16 such that its rotational axes are orthogonal to each other and are parallel to the mirror surface.

In another embodiments code discs can be used as transducers also in combination with rotary potentiometers and/ or reflex light barriers. These can also be combined with the transducers described above.

The above described embodiments relate to an interior mirror having a dipping device.

The transducers and members for controlling respectively can also be provided on a fixed fastening member, i.e. a support like fastening member designed to be fixed to the mirror housing without the tilting device for pivoting the mirror housing for dipping.

Based on the arrangement of the transducers and members for controlling according to the invention inside the mirror housing, all measuring elements are optically covered and nevertheless a flat interior mirror can be provided.

What is claimed is:

1. A manually adjustable mirror (1) comprising;
   a mirror foot (4),
   a mirror housing (2) rotatable relative to said mirror foot (4),
   said mirror housing (2) connected to said mirror foot (4) by a fastening member (11) such that said mirror housing (2) is rotatable about at least two axes,
   at least one transducer (6a, 6b, 7a, 7b) disposed within said mirror housing (2), and
   at least one operation element (10, 10a, 10b, 17) mounted within said mirror housing (2) and moveable relative to said mirror housing (2), said operation element (10, 10a, 10b, 17) selectively engageable with said transducer (6a, 6b, 7a, 7b) to move said transducer (6a, 6b, 7a, 7b) in response to movement of said mirror housing (2) thereby detecting the relative movement of the mirror housing (2) to the mirror foot (4).

2. A mirror according to claim 1, characterized in that said mirror housing is fastened to a support like fastening member (11) pivotally about a predetermined axis and said support like fastening member is articulated to the mirror foot (4) rotatably about at least two axes, and in that said at least one transducer (6a, 6b, 7a, 7b) is connected to the support like fastening member (11) and the member for controlling (10, 10a, 10b, 12) is connected to the mirror foot (4).

3. A mirror according to claim 1, characterized in that two transducers having respective members for controlling are provided, which are arranged in close proximity to each other inside the mirror housing.

4. A mirror according to claim 1, characterized in that said transducers and members for controlling detect rotations of the fastening member (11) regarding the mirror foot (4) about axes inside the surface of the mirror element.

5. A mirror according to claim 1, characterized in that said at least one transducer is formed as a rotary potentiometer (6a, 6b) or slide resistor (7a, 7b) and said member for controlling includes at least one connecting rod (10, 10a, 10b), wherein the latter is articulated to the mirror foot (4) via a pivot (12).

6. A mirror according to claim 5, characterized in that said at least one connecting rod (10, 10a, 10b) essentially extends in a plane being parallel to the surface of the mirror element.

7. A mirror according to any of claims 1 to 4, characterized in that said at least one transducer comprises a Hall element and said at least one member for controlling comprises a magnetic element.

8. A mirror according to any of the preceding claims, characterized in that said mirror foot (4) is connected to the support like fastening member (11) via a ball-and-socket joint (8), wherein the ball (9) is designed to be fixed to the mirror foot (4) and the spherical member (16) is designed to be fixed to the fastening member (11).

9. A mirror according to claim 8, characterized in that swivelling rollers as transducers are mounted to the spherical member (16) of the ball-and-socket joint (8) such that they are frictionally connected to the ball (9) of the ball-and-socket joint (8).

10. A mirror according to claim 8, characterized in that the rotational axes of the swivelling rollers correspond essentially with the two orthogonal axes, which are perpendicular upon the normal to the surface of the mirror element.

\* \* \* \* \*

UNITED STATES PATENT AND TRADEMARK OFFICE
CERTIFICATE OF CORRECTION

PATENT NO. : 6,069,756
DATED : May 30, 2000
INVENTOR(S) : Heinz et al.

It is certified that error appears in the above-identified patent and that said Letters Patent are hereby corrected as shown below:

Column 4, Line 24, please delete "plate" and insert -- place --.

Column 4, Line 24, please delete "or" and insert -- of --.

Signed and Sealed this

Third Day of April, 2001

Attest:

NICHOLAS P. GODICI

Attesting Officer     Acting Director of the United States Patent and Trademark Office